United States Patent [19]

Ginter

[11] Patent Number: 4,521,144
[45] Date of Patent: Jun. 4, 1985

[54] QUILL STOP DEVICE

[76] Inventor: Carl A. Ginter, 3716 27th Ave. S., Minneapolis, Minn. 55406

[21] Appl. No.: 519,541

[22] Filed: Aug. 2, 1983

[51] Int. Cl.³ .................. B23Q 21/00; F16B 37/10
[52] U.S. Cl. ........................... 409/218; 408/241 S; 411/433; 411/437
[58] Field of Search ............ 409/218; 408/241 S, 408/221, 202; 411/432, 433, 437

[56] References Cited

U.S. PATENT DOCUMENTS 2,574,653  11/1951  Miller .......................... 408/241 S

FOREIGN PATENT DOCUMENTS

| 2723058 | 11/1978 | Fed. Rep. of Germany ...... 411/437 |
| 59207 | 12/1967 | German Democratic Rep. ................................... 411/433 |
| 1437648 | 6/1976 | United Kingdom ................ 411/437 |
| 726374 | 4/1980 | U.S.S.R. .............................. 411/432 |

Primary Examiner—Z. R. Bilinsky

[57] ABSTRACT

This quill stop device is designed to replace the old-type quill stop devices used on milling and other machines, such as drill presses. Primarily, it consists of a threaded shaft, having a ring with a cut-out opening in its side, so as to be placed quickly and removed on the machine, for setting depth limits, and the ring is made of nylon material, so as to engage the threads of the shaft frictionally at all times.

1 Claim, 4 Drawing Figures

U.S. Patent   Jun. 4, 1985   4,521,144
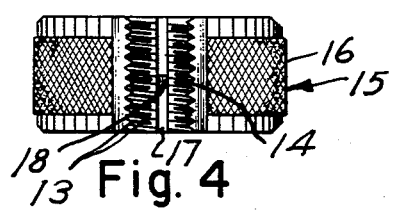
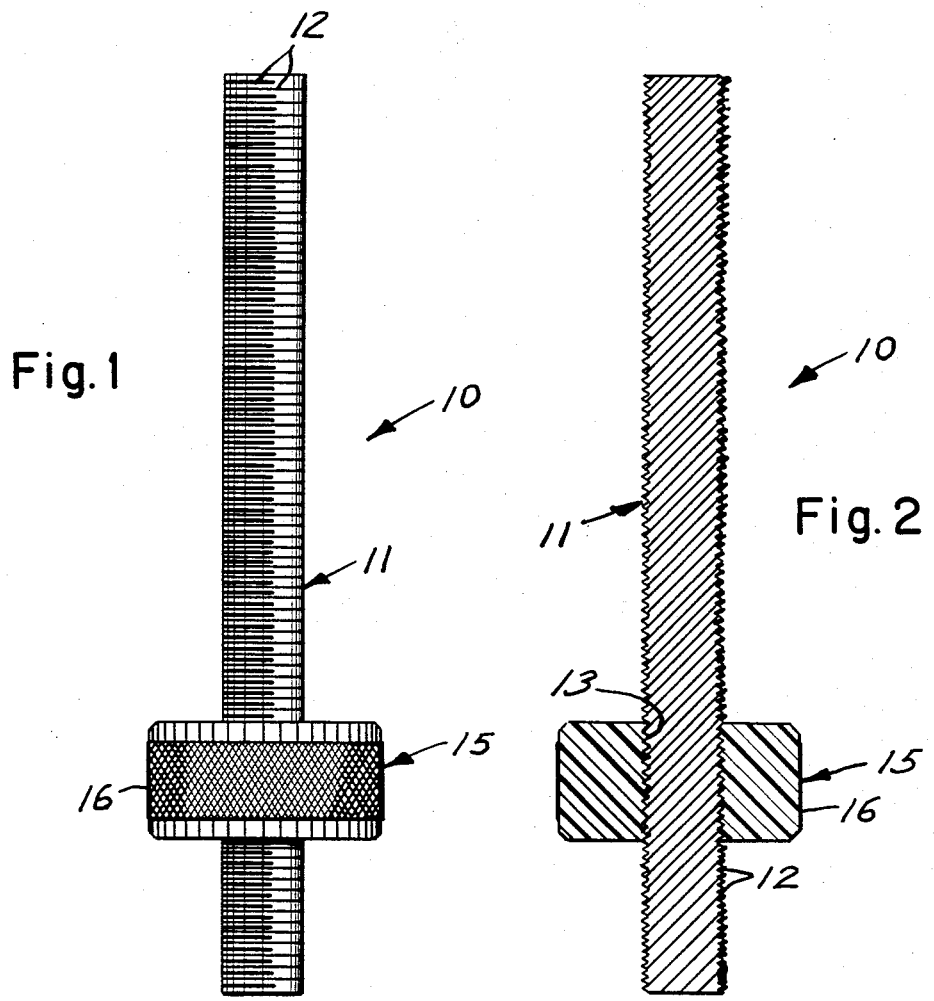
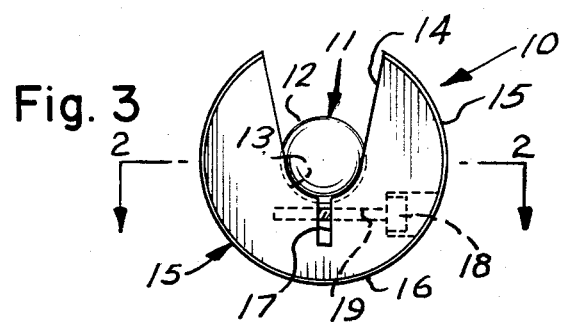

QUILL STOP DEVICE

This invention relates to stop devices for machines, and more particularly, to a quill stop device.

The principal object of the invention is to provide a quill stop device, which will be an improvement over such devices of the prior art.

Another object of this invention is to provide a quill stop device, which will be employed on milling, or any machine, that uses a threaded quill.

Another object of this invention is to provide a quill stop device, which will be unique for employment on milling machines, drill presses, and the like, when drilling or milling holes from one inch to five inches deep, because the operator does not have to screw the stop device up or down one-hundred revolutions, as is required of stop devices of the prior art.

A further object of this invention is to provide a quill stop device, which will be of such structure, that it only has to be pushed on and pulled off at any desired depth.

A still further object of this invention is to provide a quill stop device, which will be of such design, that it will clip on for rapid depth setting, and it will also include top and bottom positioning clamp ring means.

An even further object of this invention is to provide a quill stop device, which will have the ring clamp fabricated of nylon material, which has the inherent quality of springing back to fit the threaded shaft with the correct amount of tension, and it will not release under machine vibration.

Other objects are to provide a quill stop device, which is simple in design, inexpensive to manufacture, rugged in construction, easy to use, and efficient in operation.

These, and other objects, will be readily evident, upon a study of the following specification, and the accompanying drawing, wherein:

FIG. 1 is a vertical elevational view of the present invention;

FIG. 2 is a cross-sectional view, taken along the line 2—2 of FIG. 3;

FIG. 3 is a top plan view of FIG. 1, and

FIG. 4 is a rear elevational view of the clamp ring, shown removed from the invention.

Accordingly, a quill device 10 is shown to include a shaft 11, having external threads 12, which receive the internal threads 13 of the opening 14 of clamp ring or collar 15. Clamp ring or collar 15 is fabricated of a suitable resilient plastic, and its outer periphery 16 is knurled for easy finger gripping. The opening 14, through the outer periphery 16, is angular in configuration, so as to snap onto shaft 11 when it is desired, and a rectangular opening 17 intersects with opening 14 of angular configuration, so as to enable the clamp ring 15 to be adjustably tightened or loosened on shaft 11 by a set screw 18, which is threadingly received in a threaded opening 19 in clamp ring 14. As shown in FIG. 3 of the Drawing, it is to be noted that the outwardly diverging side walls of the opening 14 extend tangentially to the screw thread root diameter, the start of which is shown by the solid line at the upper left of the shaft, while the screw thread outer diameter is cut into the side walls, as indicated by the dotted line.

In use, shaft 11 is received in a milling or other machine, in place of the quill stop of the prior art, and clamp ring 15 snaps onto shaft 11, and frictionally clamps or retains itself thereto. The clamp ring 15 is removably received on shaft 11, so as to adjust for rapid depth setting, and ring 15 can be rotated with the operator's fingers, for fine adjustments.

While various changes may be made in the detail construction, it is understood that such changes will be within the spirit and scope of the present invention, as is defined by the appended claims.

I claim:

1. A quill stop device, comprising, in combination, a shaft, a ring received on said shaft and a set screw received in said ring; said shaft having an external screw thread; said ring being made of resilient plastic material, said ring being circular and including an inwardly converging opening along its outer periphery, said opening having tangentical side walls to an inward end of said opening which has a screw thread snap-engagable with said screw thread of said shaft; and said ring having a slotted opening communicating with the first said opening inner end and forming pair of jaws on said ring, said set screw drawing said jaws together for quickly locking said ring on said shaft.

* * * * *